(12) United States Patent
Tanaka et al.

(10) Patent No.: US 6,397,808 B1
(45) Date of Patent: Jun. 4, 2002

(54) ENGINE STARTER HAVING TRACTION-DRIVE TYPE REDUCTION GEAR AND TORQUE TRANSMITTING DEVICE FOR LINKING THE REDUCTION GEAR AND DRIVEN SHAFT OF ENGINE

(75) Inventors: Masashi Tanaka; Takashi Aoki; Mikihiro Takano, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/638,069

(22) Filed: Aug. 15, 2000

(30) Foreign Application Priority Data

Aug. 18, 1999  (JP) .............................. 11-232026

(51) Int. Cl.⁷ ................................................ F02N 11/00
(52) U.S. Cl. .............................. 123/179.25; 123/185.5; 74/7 E; 74/7 C; 192/42
(58) Field of Search ................. 123/179.25, 185.8; 474/134, 135; 74/6, 7 E, 7 C; 475/165, 195; 476/28; 192/42, 45

(56) References Cited

U.S. PATENT DOCUMENTS 3,380,312 A * 4/1968 Burske ......................... 476/61
4,758,208 A * 7/1988 Bartos et al. ............... 474/135
5,418,400 A * 5/1995 Stockton ...................... 290/46
5,533,415 A * 7/1996 Ackermann et al. .......... 74/7 E
5,931,759 A * 8/1999 Otaki et al. ................ 475/183

FOREIGN PATENT DOCUMENTS

| JP | 406241285 A | * 2/1993 |
| JP | 07-119600 | 5/1995 |
| JP | 08-193531 | 7/1996 |
| JP | 08-319923 | 12/1996 |
| JP | 09-280145 | 10/1997 |
| JP | 09-310677 | 12/1997 |
| JP | 10-311398 | 11/1998 |
| JP | 11190222 A | * 7/1999 |

* cited by examiner

Primary Examiner—Andrew M. Dolinar
Assistant Examiner—Arnold Castro
(74) Attorney, Agent, or Firm—Armstrong, Westerman & Hattori, LLP

(57) ABSTRACT

An engine starter for preventing undesirable noises is disclosed, which is applicable to a vehicle employing an idle stop system. The starter comprises a starter motor; a traction-drive type reduction gear connected to the starter motor and positioned between the starter motor and a driven shaft of the engine; and a torque transmitting device via which the reduction gear and the driven shaft are linked.

10 Claims, 7 Drawing Sheets

ENGINE STARTER HAVING TRACTION-DRIVE TYPE REDUCTION GEAR AND TORQUE TRANSMITTING DEVICE FOR LINKING THE REDUCTION GEAR AND DRIVEN SHAFT OF ENGINE

BACKGROUND OF THE INVENTION

1. Field of the Invention

The present invention relates to an engine starter for starting an engine.

2. Description of the Related Art

Conventionally, engine starters which are driven by a battery are known. Japanese Unexamined Patent Application, First Publication, No. Hei 9-310677 discloses an example of a starter, in which an epicyclic (or planetary) ring gear is flexibly supported by a case, so that the engagement between gear wheels is loosened and the rattling state due to backlash is reduced, thereby reducing noise.

Japanese Unexamined Patent Application, First Publication, No. Hei 9-280145 discloses another example, in which the rotation of the starter motor at the initial phase of the engagement between the ring gear and the pinion gear is restricted, thereby reducing the impact at the initial phase of the engagement. Simultaneously, an epicyclic ring-type reduction gear is loosely attached to a case so as to absorb the impact when the ring gear and the pinion gear are engaged.

Japanese Unexamined Patent Application, First Publication, No. Hei 7-119600 discloses another example of the starter, in which an epicyclic ring-type reduction gear is made of a resin, and is attached to the case in a rotatable form, so that the impact due to unsatisfactory engagement caused by backlash is reduced.

Japanese Unexamined Patent Application, First Publication, No. Hei 8-319923 also discloses another example, in which the slip torque of a one-way clutch is smaller, and the backlash of the ring and pinion gears much more easily disappears, the free running time of the motor is smaller, and the relative rotational difference between the starter motor and the ring gear is canceled, so that the impact and noise generated when the gear faces hit each other are reduced.

In the above conventional engine starters, an impact or vibration transmission, caused by a rattling state of the reduction gear which is positioned between the starter motor and the driven shaft of the engine, can be reduced in some degree. However, it is very difficult to completely remove such a rattling state in the reduction gear. In order to reduce the rattling state, it is effective to improve the accuracy of each gear wheel, or to provide a "no-backlash" mechanism (which causes no backlash). However, these means increase the necessary cost, and are generally not suitable for mass production. In addition, pinion-gear engaged starters, which are currently the most common type, require some backlash, so that the workable no-backlash mechanisms or means for reducing the backlash are limited.

Recently, in order to reduce fuel consumption, an idle stop system for stopping the engine in the idling operation has gradually become practical. In a vehicle having such an idle stop system, the starting operation is much more frequently executed; thus, with the above-explained engine starter, impacts or noises are generated and the product value may be degraded. This problem should be solved if the idle stop system is to be employed in a vehicle.

In order not to generate the noises at the start of the vehicle, the engine crankshaft or the like may be directly driven without using a reduction gear (an example thereof is disclosed in Japanese Unexamined Patent Application, First Publication, No. Hei 8-193531). However, in this case, a motor outputting high power, a high-voltage power supply, and the like are necessary, so that the weight of the vehicle body is increased, flexibility of the arrangement of each device is degraded, and the cost is considerably increased.

SUMMARY OF THE INVENTION

In consideration of the above circumstances, an objective of the present invention is to provide an engine starter for preventing undesirable noise, which is applicable to a vehicle employing an idle stop system.

Therefore, the present invention provides an engine starter for starting an engine, comprising:
 a starter motor;
 a traction-drive type reduction gear connected to the starter motor and positioned between the starter motor and a driven shaft of the engine; and
 a torque transmitting device via which the reduction gear and the driven shaft are linked.

The reduction gear may be coupled with a crankshaft or a cam shaft of the engine.

According to the above structure, the characteristics of the traction-drive type reduction gear are effectively used for performing smooth reduction, and the crankshaft of the engine can be smoothly driven via the torque transmitting device. Therefore, the quietness at the engine start can be improved; thus, the starter can also be applied to a vehicle which employs an idle stop system.

The torque transmitting device may comprise a belt and a pulley for transmitting the torque. Accordingly, the reduction gear ratio of the above structure can be large by using the reduction gear and the belt, thereby reducing the size of the starter.

The belt of the torque transmitting device may also function as a belt for driving auxiliaries of the engine. Accordingly, a belt for driving such auxiliaries can also be used as the belt for transmitting the torque, and thus no additional belt for the torque transmitting device is necessary. Therefore, the number of necessary parts can be reduced. In addition, a longer crankshaft in the engine is unnecessary. Therefore, preferable flexibility of the arrangement of the starter can be obtained.

The engine starter may be positioned via a pulley at a most tightly curved portion of the belt for driving the auxiliaries of the engine. This arrangement does not affect the position of a tensioner used for the belt for driving the auxiliaries. Therefore, modification of the general structure in the vicinity of the engine is unnecessary, and the starter can be easily mounted.

The traction-drive type reduction gear may be a wedge-roller type. In this case, the reduction gear has the function of a one-way clutch. Therefore, a conventional one-way clutch can be omitted, and the axial length of the starter motor can be reduced. Accordingly, the weight and the number of parts of the starter can be decreased, thereby remarkably reducing the cost.

Typically, the driven shaft of the engine is one of a crankshaft and a cam shaft. Accordingly, the engine can be started not by using gears but by using a starter motor that rotates the crankshaft or cam shaft. Therefore, the engine can be quietly started.

DESCRIPTION OF THE PREFERRED EMBODIMENTS

Hereinafter, embodiments of the engine starter according to the present invention will be explained with reference to the drawings.

FIGS. 1 to 5 show the first embodiment of the present invention.

Figure 1:
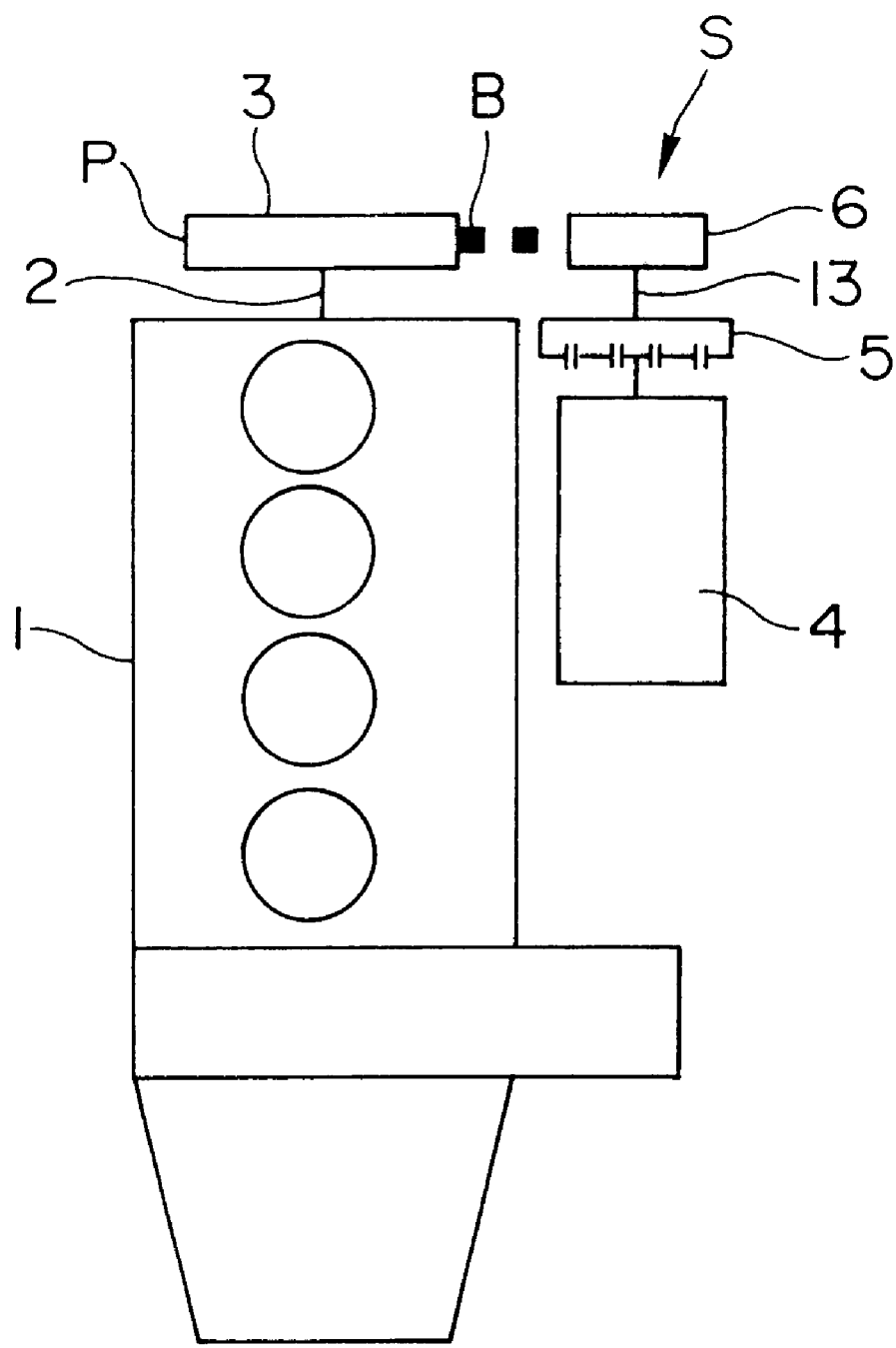
FIG. 1 is a diagram showing the general structure of the first embodiment according to the present invention.

In FIG. 1, fly wheel 3 is attached to crankshaft 2 of engine 1. An outer-peripheral area of the fly wheel 3 functions as pulley P, to which an engine starter (below, called just "starter") S is linked via belt B.

Figure 2:
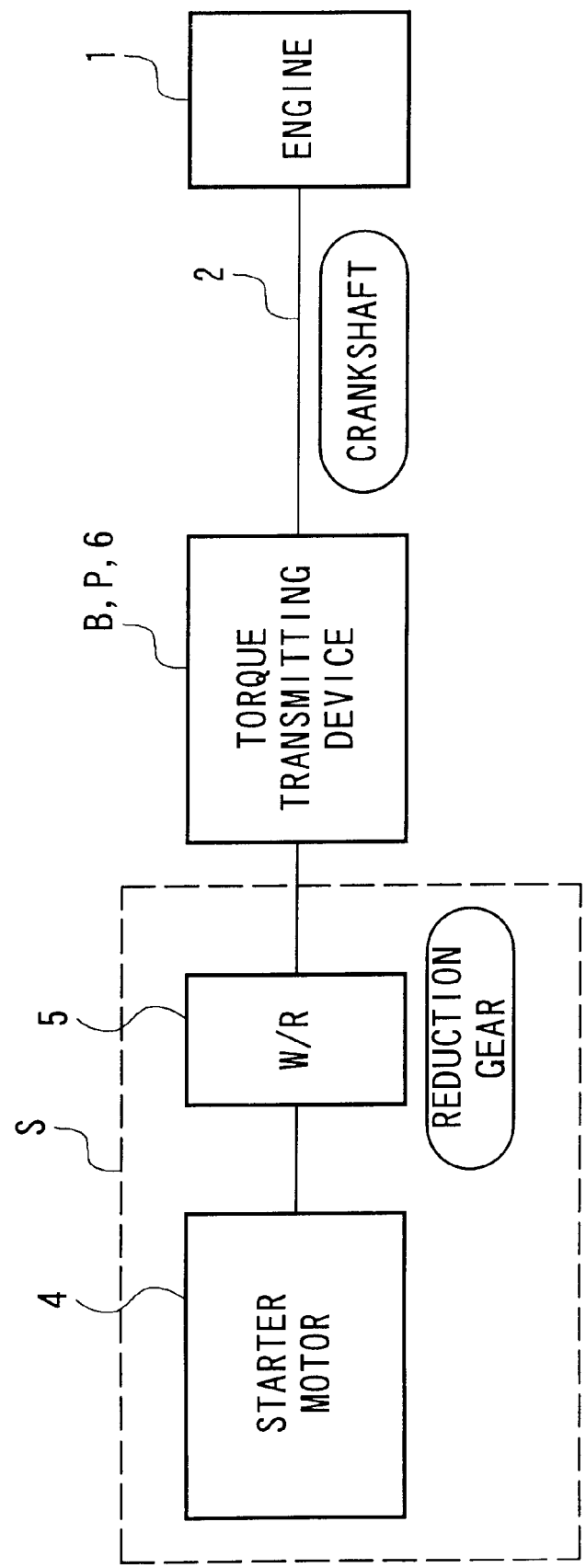
FIG. 2 is a block diagram corresponding to the structure shown in FIG. 1.

The starter S comprises starter motor 4, a traction-drive type reduction gear, specifically, wedge-roller type reduction gear 5 (explained later), and pulley 6. FIG. 2 is a block diagram corresponding to the structure shown in FIG. 1. The starter motor 4 and the wedge-roller type reduction gear 5 are integrally arranged, and the reduction gear 5 and engine 1 are linked via belt B, which functions as a torque transmitting device.

Figure 3:
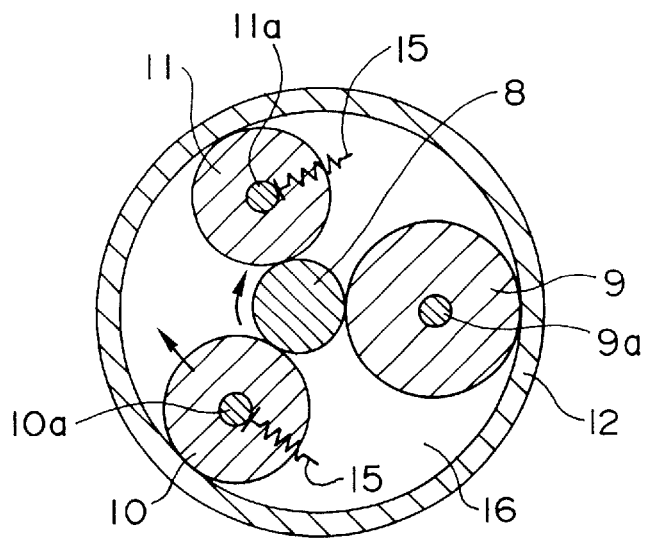
FIG. 3 is a sectional view along line A in FIG. 4, which shows characteristic parts of the first embodiment.
Figure 4:
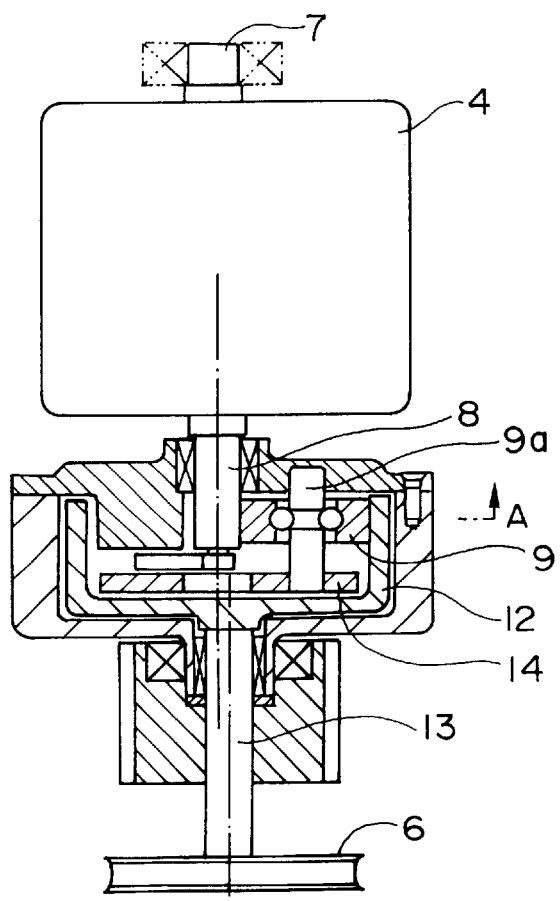
FIG. 4 is another sectional view showing characteristic parts of the first embodiment.

As shown in FIG. 3, the wedge-roller type reduction gear 5 has a structure, for example, as disclosed in Japanese Unexamined Patent Application, First Publication, No. Hei 10-311398. That is, central roller 8 is attached to shaft 7 of the starter motor 4, and around the central roller 8, three intermediate rollers 9, 10, and 11 are arranged in a manner such that each intermediate roller contacts the central roller 8 while the intermediate roller rotates. These intermediate rollers 9, 10, and 11 are surrounded by outer ring roller 12. As shown in FIG. 4, the outer ring roller 12 is attached to shaft 13 of reduction gear 5. Theirotation of the starter motor 4 is transmitted via central roller 8 to intermediate rollers 9, 10, and 11, and the rotation of each intermediate roller is transmitted to the outer ring roller 12 so that shaft 13 is rotated. Here, the above pulley 6 is attached to shaft 13 of reduction gear 5.

As shown in FIG. 4, the central roller 8 is eccentrically positioned with respect to the outer ring roller 12, and the first intermediate roller 9, which is one of the intermediate rollers, is positioned between the central roller 8 and outer ring roller 12, and contacts both of them. Also as shown in FIG. 4, connecting plate 14 is attached to shaft 9a of the first intermediate roller 9. The second intermediate roller 10 and the third intermediate roller 11 are movably supported by shafts 10a and 11a, where the shafts 10a and 11a are supported by the connecting plate 14 and the outer ring roller 12. In addition, space 16 is formed between the outer ring roller 12 and central roller 8. The second and third intermediate rollers 10 and 11 are forced by springs 15 towards a smaller-width side (or area) of the space 16. Furthermore, an arm (not shown) is provided to the third intermediate roller 11, where the arm pushes the shaft 11a (of roller 11) towards a larger-width area of space 16.

Therefore, when the central roller 8 rotates in the direction indicated by the arrow in FIG. 3, the second intermediate roller 10 is pushed into a space between the central roller 8 and the outer ring roller 12, so that the second intermediate roller 10 is supported between the central roller 8 and outer ring roller 12. Accordingly, the contact pressure generated between the central roller 8 and the first intermediate roller 9 becomes larger, and power is transmitted from the first and second intermediate rollers 9 and 10 to outer ring roller 12. In this process, the third intermediate roller 11 moves towards a larger-width area of space 16; thus, the third intermediate roller 11 does not actively participate in power transmission.

If the central roller 8 tries to rotate in the direction opposite to the above, the above-explained arm prevents the third intermediate roller 11 from moving. Therefore, the third intermediate roller 11 never moves to the smaller-width side in space 16, and the intermediate rollers 9, 10, and 11 do not contribute to power transmission between the outer ring roller 12 arid the central roller 8. Accordingly, if the central roller 8 reversely rotates, power is not transmitted to the outer ring roller 12.

The structure of the wedge-roller type reduction gear is not limited to the above, but any structure for transmitting power using friction may be used, such as conventional reduction gears disclosed in the above publications, the reduction gear in the second embodiment of the present invention, or any other wedge-roller type reduction gear.

According to the above embodiment, the starter motor 4 drives the fly wheel 3 via reduction gear 5 and belt B, thereby starting the engine 1. In this process, no gear for transmitting power is used, and power is mainly transmitted by rollers in reduction gear 5. Therefore, smoother deceleration is possible and crankshaft 2 of engine 1 can be smoothly driven by using belt B, thereby improving the quietness at the engine start. Accordingly, the present embodiment can also be applied to a vehicle which frequently uses the starter employing an idle stop system. In addition, the reduction gear ratio of the above structure can be large by using the reduction gear 5 and belt B, thereby reducing the device size.

Figure 5:
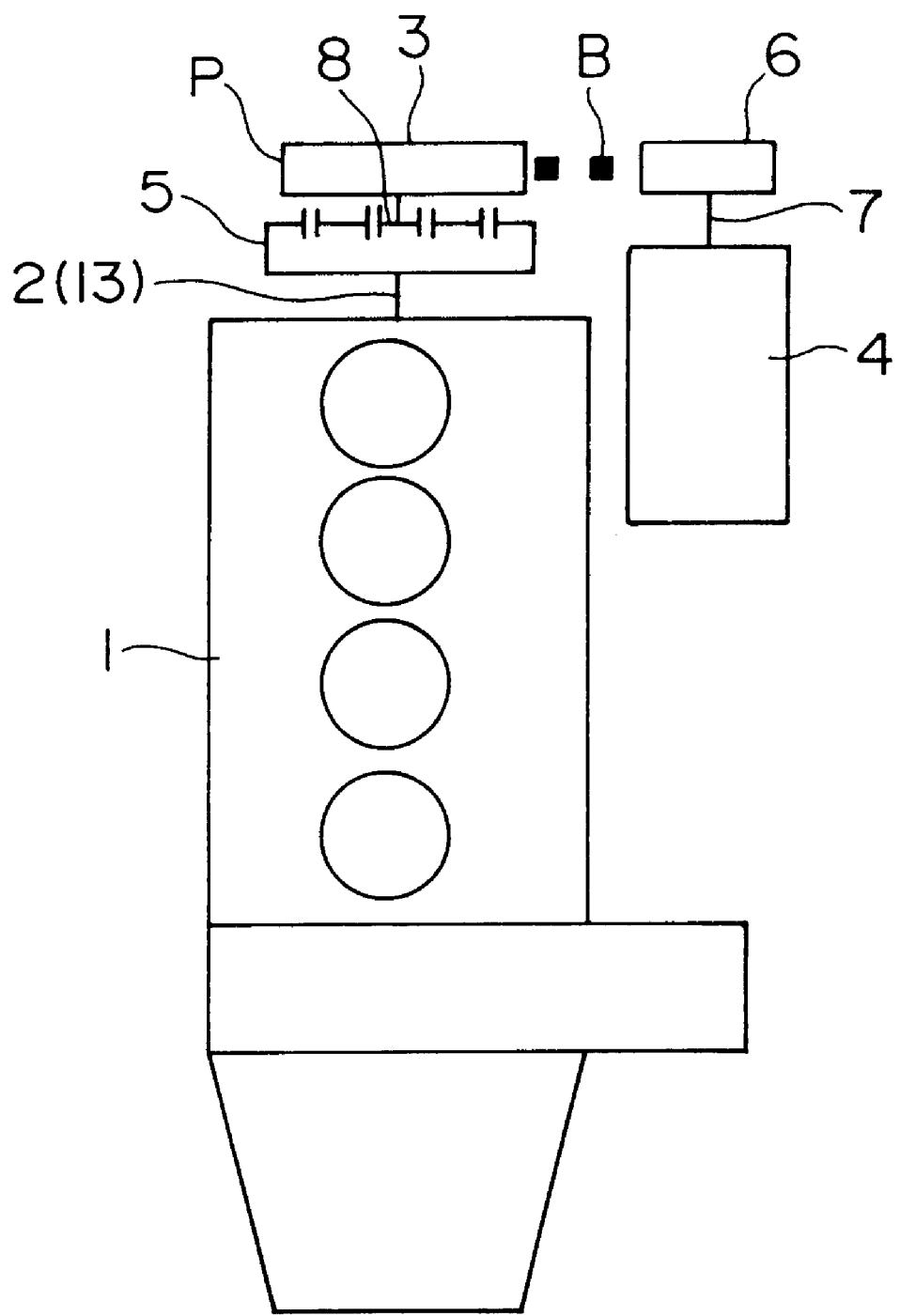
FIG. 5 is a diagram. showing the general structure of the second embodiment according to the present invention.
Figure 6:
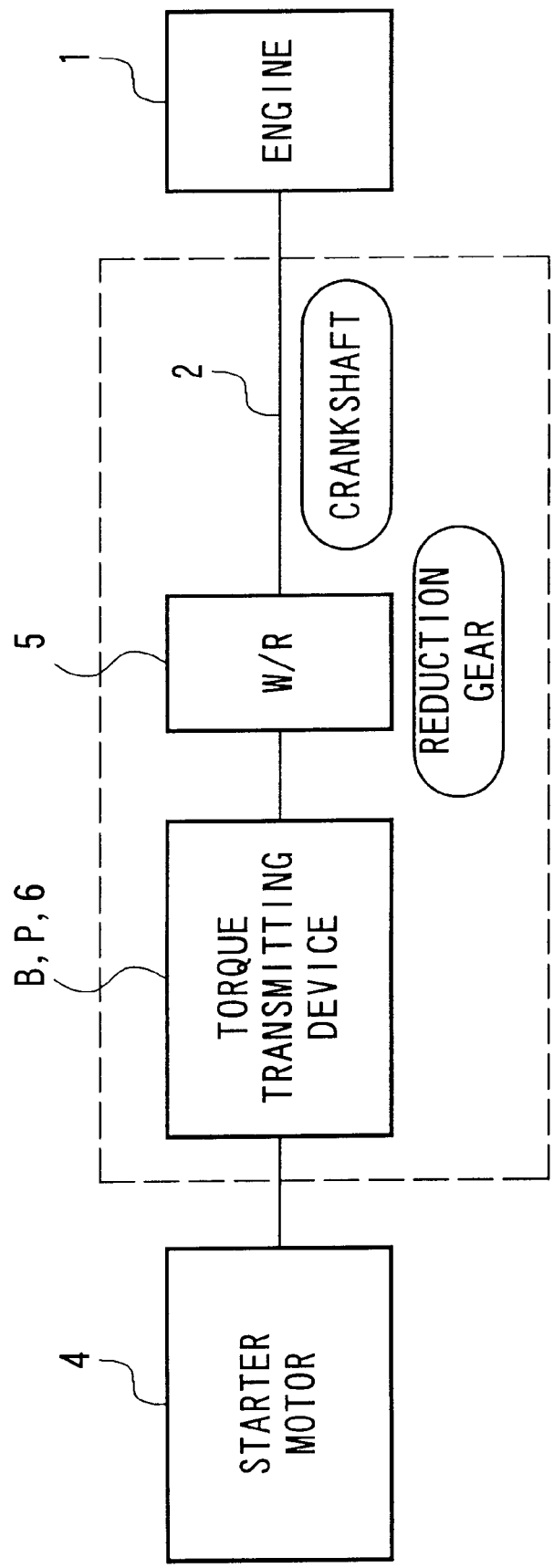
FIG. 6 is a block diagram corresponding to the structure shown in FIG. 5.

Below, the second embodiment according to the present invention will be explained with reference to FIGS. 5 and 6. In these figures, parts identical to those in FIGS. 1 to 4 are given identical reference numerals (this rule is also effective in the following embodiments).

In the second embodiment, the reduction gear 5 in the first embodiment is attached to the crankshaft 2 of engine 1. A pulley 6 is attached to shaft 7 of starter motor 4, and this pulley 6 and pulley P of fly wheel 3 of engine 1 are linked via belt B, and reduction gear 5 is provided at a position (middle position or the like) of crankshaft 2 to which the fly wheel 3 is attached. More specifically, the shaft of the above central roller 8 is connected to the fly wheel 3, while the shaft of the outer ring roller 12 is connected to the engine 1. In this second embodiment, as shown in the block diagram in FIG. 6, reduction gear 5. and belt B which functions as the torque transmitting device are integrally arranged.

Therefore, also in the present embodiment, the quietness at the engine start can be improved, and the second embodiment can also be applied to a vehicle employing an idle stop system.

Below, the third embodiment of the present invention will be explained with reference to FIGS. 7, 8, and 9 which respectively show three different examples.

In each example, engine 1 is started by driving cam shaft 17 of engine 1.

Figure 7:
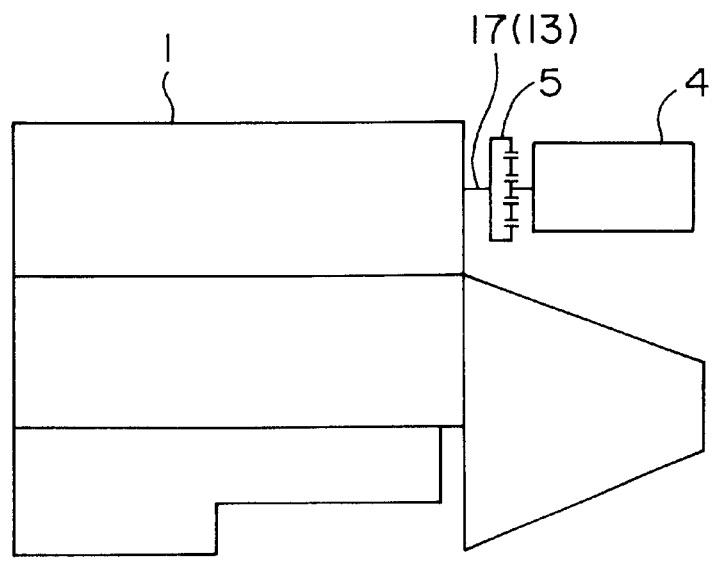
FIG. 7 is a diagram showing the general structure of the first example of the third embodiment according to the present invention.

In the structure shown in FIG. 7, pulley 6 attached to shaft 13 of reduction gear 5 in the first embodiment is omitted, and the shaft 13 is directly coupled with cam shaft 17 of engine 1. According to the present embodiment, in addition to the effects obtained by the above embodiments, the number of necessary parts can be decreased because belt B is unnecessary.

Figure 8:
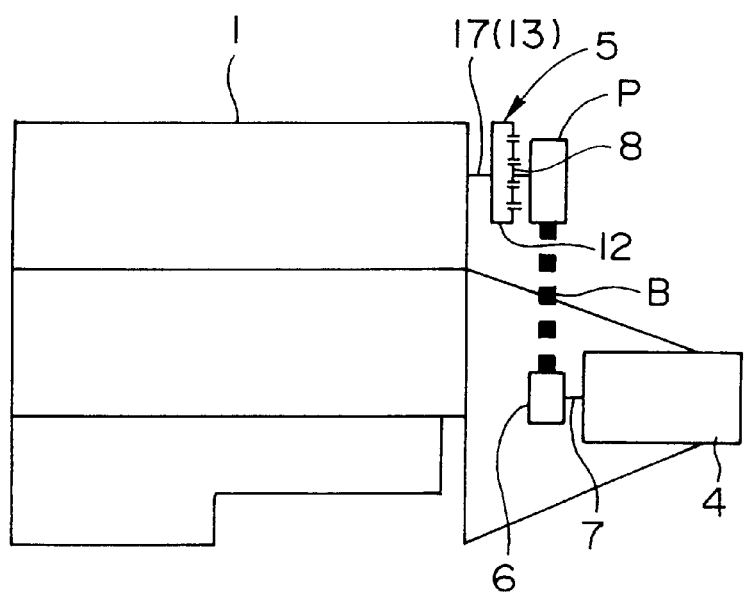
FIG. 8 is a diagram showing the general structure of the second example of the third embodiment according to the present invention.

In the structure shown in FIG. 8, (i) pulley 6 is attached to shaft 7 of starter motor 4, (ii) shaft 13 of outer ring roller 12 of the reduction gear 5 is coupled with cam shaft 17 of engine 1, (iii) pulley P is attached to the central roller 8 of reduction gear 5, and (iv) pulley 6 at the starter motor 4 side and pulley P at the cam shaft 17 side are linked using belt B. Therefore, the quietness can also be improved in the present embodiment without using a gear.

Figure 9:
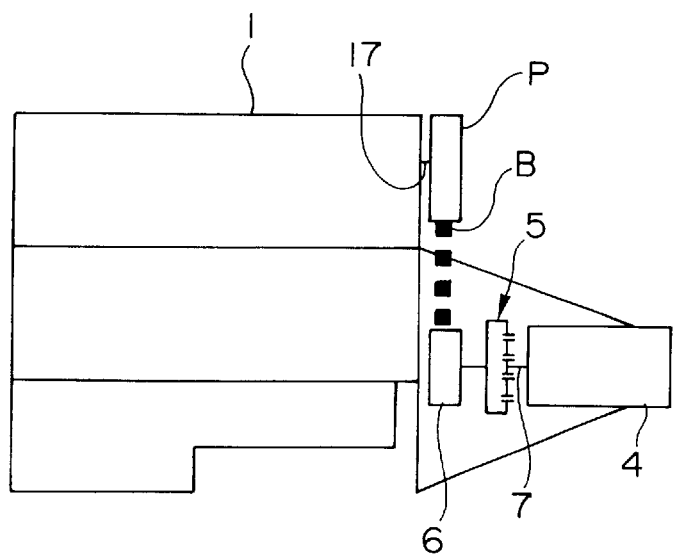
FIG. 9 is a diagram showing the general structure of the third example of the third embodiment according to the present invention.

In the structure shown in FIG. 9, the reduction gear 5 shown in FIG. 8 is provided at a position of shaft 7 of starter motor 4. The other structural elements are similar to those shown in FIG. 8. Therefore, also according to the present embodiment, the quietness can be improved.

Below, the fourth embodiment of the present invention will be explained with reference to FIG. 10.

Figure 10:
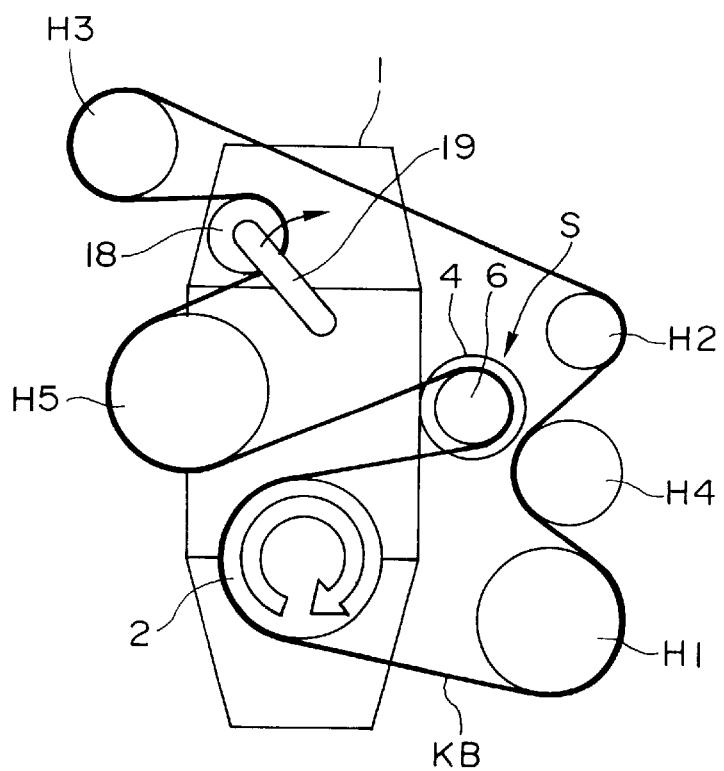
FIG. 10 is a diagram showing the general structure of the fourth embodiment according to the present invention.

In FIG. 10, auxiliaries H such as compressor H1 of the air conditioner, generator H2, pump H3 of the power steering, idler H4, and water pump H5 are linked to crankshaft 2 of engine 1 via driving belt KB. A tensioner 18 for stretching the driving belt KB by using arm 19 is provided so that a fixed tension is applied to the driving belt KB. A starter S is provided in a most tightly curved (or warped) portion of the belt KB, and the crankshaft 2 rotates according to the rotation of starter motor 4 via driving belt KB. As in the first embodiment shown in FIG. 1, the starter S has starter motor 4 and reduction gear 5 which are integrally arranged. A pulley 6 is attached to the reduction gear 6, and the driving belt KB is also arranged around the pulley 6.

Therefore, in the present embodiment, preferable quietness can be maintained, and a presently available (or known) driving belt (KB) can be used, thereby reducing necessary parts. In the previous embodiments, the longitudinal length of crankshaft 1 or cam shaft 17 of engine 1 must be longer; however, in the present embodiment, such an extended shaft is unnecessary. Accordingly, flexibility of the arrangement of the starter can be improved. In addition, the starter S is positioned in a most tightly curved portion of the driving belt KB; thus, it is unnecessary to move the above tensioner 18 to another position. Therefore, it is unnecessary to rearrange the general structure in the vicinity of the engine; thus, the starter of the present embodiment can be easily mounted.

According to the above embodiments, a conventional one-way clutch is unnecessary because the reduction gear 5 has the function of a one-way clutch. Therefore, the axial length of the starter motor can be reduced, and the weight and the number of necessary parts can be reduced, thereby remarkably reducing the necessary cost.

The present invention is not limited to the above-explained embodiments. For example, a round-type (i.e., having no end) belt-like member such as a chain may be used as the torque transmitting device.

What is claimed is:

1. An engine starter for starting an engine, comprising:
   a starter motor;
   a driven shaft of the engine;
   a traction-drive reduction gear for transmitting power by friction; and
   a torque transmitting device for transmitting torque generated by the starter motor to the driven shaft of the engine, wherein
   the reduction gear and torque transmitting device are provided between the starter motor and the driven shaft of the engine.

2. An engine starter as claimed in claim 1, wherein the torque transmitting device comprises a belt and a pulley for transmitting the torque.

3. An engine starter as claimed in claim 2, wherein the belt of the torque transmitting device also functions as a belt for driving auxiliaries of the engine.

4. An engine starter as claimed in claim 3, which is positioned via a pulley at a most tightly curved portion of the belt for driving the auxiliaries of the engine.

5. An engine starter as claimed in claim 1, wherein the traction-drive reduction gear is of a wedge-roller type.

6. An engine starter as claimed in claim 1, wherein the driven shaft of the engine is one of a crankshaft and a cam shaft.

7. An engine starter as claimed in claim 1, which is built in a vehicle employing an idle stop system in which starting operation using the starter motor is frequently executed.

8. An engine starter as claimed in claim 4, wherein the starter motor is adjacently placed to the driven shaft of the engine in a power transmission path of the belt for the auxiliaries of the engine.

9. An engine starter as claimed in claim 5, wherein the wedge-roller type reduction gear has a function of a one-way clutch.

10. An engine starter as claimed in claim 3, wherein the starter motor is connected to the traction-drive reduction gear, and this reduction gear is coupled with the driven shaft of the engine via the belt and the pulley.

* * * * *